T. H. SAMPSON.
APPARATUS FOR THE TREATMENT OF RED GUM AND OTHER LIKE WOODS.
APPLICATION FILED JULY 8, 1912.
1,131,427.
Patented Mar. 9, 1915.
2 SHEETS—SHEET 1.
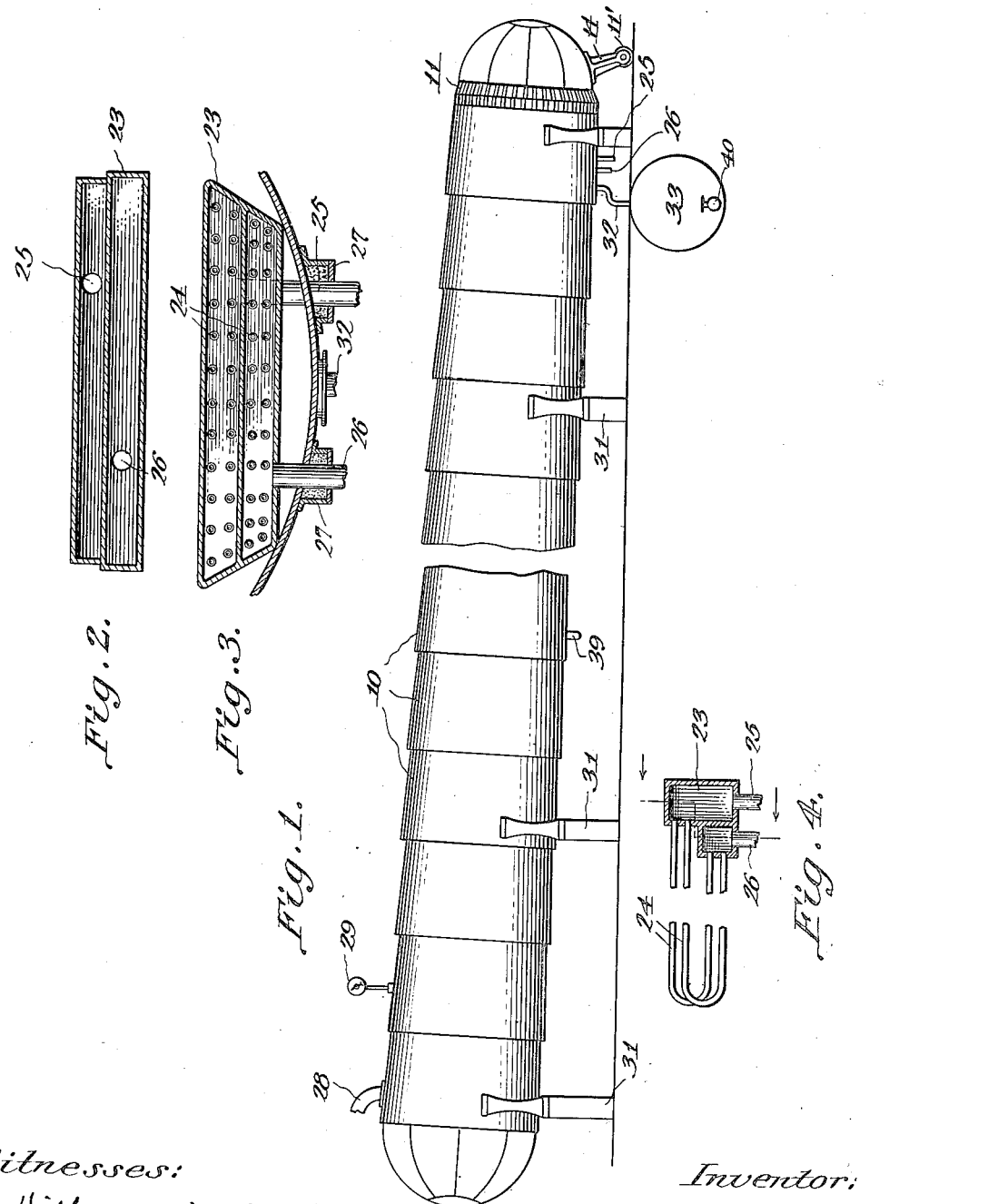

T. H. SAMPSON.
APPARATUS FOR THE TREATMENT OF RED GUM AND OTHER LIKE WOODS.
APPLICATION FILED JULY 8, 1912.
1,131,427.
Patented Mar. 9, 1915.
2 SHEETS—SHEET 2.
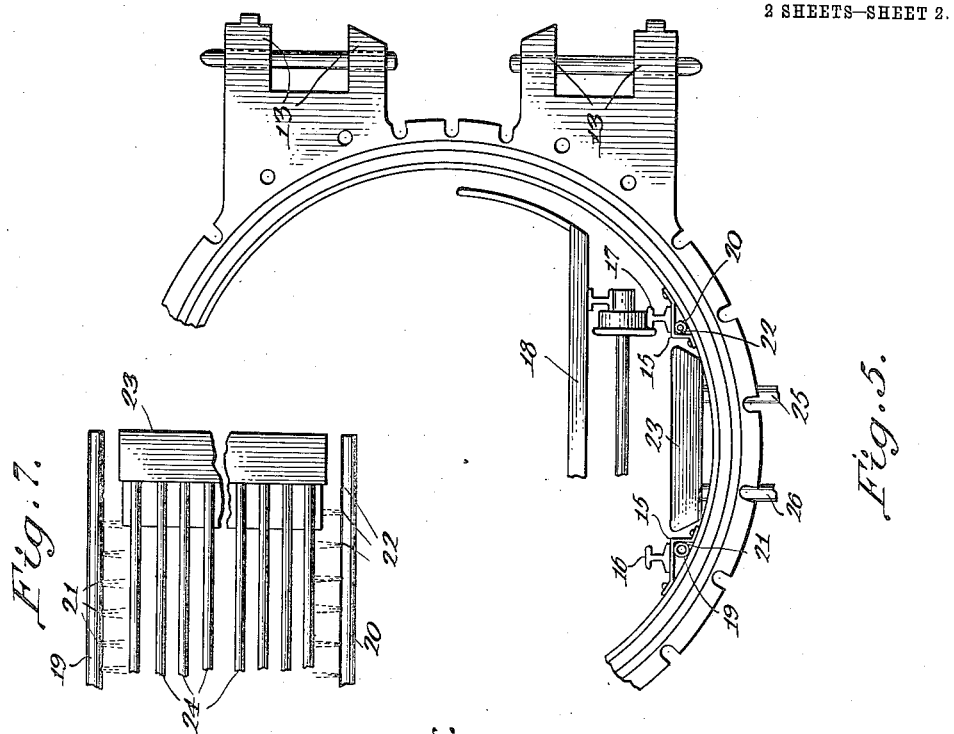
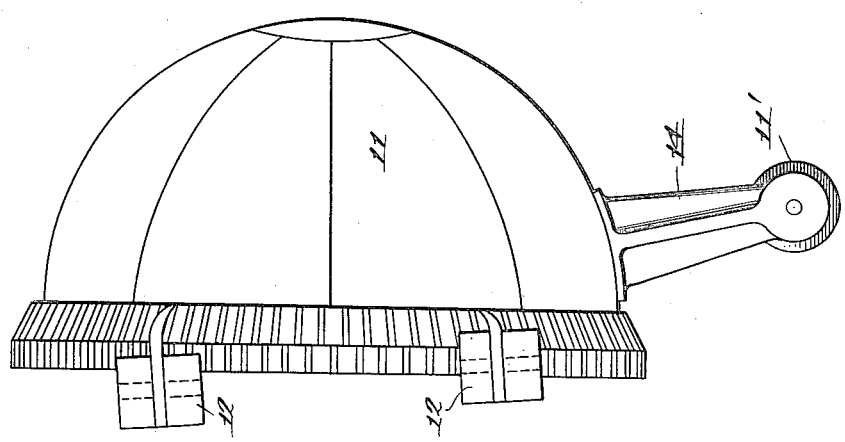
Witnesses:
William C. McLeod
Rosa Klar
Inventor:
Thomas Harlow Sampson

UNITED STATES PATENT OFFICE.

THOMAS HARLOW SAMPSON, OF NEW ORLEANS, LOUISIANA.

APPARATUS FOR THE TREATMENT OF RED GUM AND OTHER LIKE WOODS.

1,131,427. Specification of Letters Patent. Patented Mar. 9, 1915.

Application filed July 8, 1912. Serial No. 708,386.

*To all whom it may concern:*

Be it known that I, THOMAS HARLOW SAMPSON, a citizen of the United States of America, a resident of New Orleans, parish of Orleans, and State of Louisiana, have invented a new and useful Apparatus for the Treating of Red Gum and other like Woods, of which the following is a specification.

This invention relates to an apparatus for treating red gum and other like woods, with the primary object of preventing sap stain and stick rot when in pile, warping or twisting when dried, and the giving said wood, treated by the process, a deeper red color.

The further object of this invention is to provide an apparatus capable of use in carrying out the process disclosed in my Letters-Patent Number 1,048,102, dated Dec. 24, 1912, in an expeditious and inexpensive manner for attaining the several objects indicated and specifically claimed.

In describing the invention in detail, reference will be had to the accompanying drawings forming a part of this specification, wherein like characters denote corresponding parts in the several views, in which:—

Figure 1 illustrates a side elevation of an apparatus suitable for carrying out my process. Fig. 2 is a sectional view of the manifold steam connection 23. Fig. 3 is a section of the steam header taken on the dotted line in Fig. 4 and looking in the direction of the arrow, showing the same with connections for supplying steam thereto, and exhausting the condensed steam therefrom. Fig. 4 is a sectional view of the header showing the steam pipes connected thereto; Fig. 5 is an end view of the retort with the door removed, showing the fragment of a truck therein for carrying the material to be treated; Fig. 6 is an enlarged detail view of one end of the retort; Fig. 7 is a view of heating manifold with connecting piping, and perforated piping for introduction of live steam to the cylinder.

In carrying out the invention I provide a chamber formed of a series of sections, 10, all of said sections being conical and slightly tapered in order that the small end of one section may fit into the large end of the next succeeding section, riveted or otherwise secured together to form tight joints. The several sections when assembled produce a cylinder, and the length and diameter of the cylinder is an immaterial detail and it may be varied to suit particular requirements. Both ends of the cylinder may be removable (in the drawing but one is shown), but have air and steam tight joints with the cylinder.

I have shown in Fig. 6 an enlarged detail of the door, 11, which, it will be seen, is provided with arms, 12, designed to be hinged to lugs, 13, formed on the cylinder, whereas 14 is the support supplied with roller 11', upon which the door is supported in opening and closing.

Within the cylinder I provide a series of brackets, 15, on each side of the longitudinal center of the said cylinder, and I attach the said brackets to the interior of the cylinder for the purpose of supporting the two rails, 16 and 17, which form a track for the truck 18, designed to contain the material to be treated.

The brackets embrace and retain in place two lines of pipe, 19 and 20, which, in practice, have connection on each side of cylinder, with a source of steam supply 39, and said pipes 19 and 20 are provided throughout their entire length with orifices 21 and 22 respectively; the orifices in one pipe facing the orifices in the opposite pipe in order that steam discharged therefrom will be directed horizontally toward the heating pipes of the cylinder.

Within the cylinder, at lower end thereof, I place a manifold steam connection, 23, which in operation, has direct connection with the boiler or steam supply by pipe 25, and this manifold has connected to it at its upper vertical face, a series of steam pipes, 24, which extend practically the full length of the cylinder and return, in order that a circulation of steam may be established throughout the said pipes 24. The manifold and the steam pipes are stationed near the bottom of the cylinder in position to receive the jets of steam from the pipes 19 and 20, which pipes will, as stated, carry steam designed to be heated by the coils or pipes 24, previously described. The manifold is provided with a steam supply pipe, 25, and an exhaust pipe, 26, both of which extend through the bottom of the cylinder and are surrounded by stuffing boxes, 27, to produce a steam tight joint. The retort is further provided with a nipple and T 28, designed as a connection for a vacuum pump and safety valve; and a pressure gage, 29.

The cylinder or retort is supported in an inclined position by the yokes 31, in order that the condensed steam and the liquid discharged from the material under treatment may flow down to the lower end of the cylinder or retort and discharge through the pipe and valve 32 to the tank 33.

33 is an end view of a cylindrical sap tank connected by pipe 32 to the lowermost end of cylinder; which said sap tank may be of any shape that it will be tight under pressure and vacuum to be carried in cylinder; said pipe 32 to have at the most accessible part of its length an independent cut off valve.

40 is the pipe and valve for emptying the sap tank 33.

Suitable valves are provided where necessary for the purpose of controlling the several pipes, in the use of live and heating steam, vacuum by vacuum pump and the control of steam and liquids into and from the sap tank.

The apparatus, therefore, as described, comprises a means, such as a car for carrying material to be treated into a self draining cylinder or retort which is provided with a track for the wheels of the car, and with the coils of pipe for supplying the heat and moisture used in carrying out the process, and an underneath separate self-emptying tank for holding drainage from cylinder contents.

Having described my invention, what I claim and desire to secure by Letters Patent, is:

1. An apparatus for the treatment of red gum and like woods, comprising a chamber, a manifold arranged adjacent one end of the chamber; said manifold having steam connections at its under face, a series of steam heating pipes extending from the manifold and in the chamber, and perforated live-steam pipes located in the chamber at opposite sides of the steam heating pipes; the perforations of said live-steam pipes being disposed to eject steam directly on the said heating pipes.

2. An apparatus for the treatment of red gum and like woods, comprising a chamber, a heating pipe disposed in the chamber lengthwise thereof, and a perforated live-steam pipe located in the chamber at one side of the heating pipe; the perforations of said live-steam pipe being disposed to eject steam directly on said heating pipe.

3. An apparatus for the purpose described, comprising a cylinder having a removable end, brackets arranged in the cylinder at opposite sides thereof, rails secured on said brackets, live-steam pipes retained in the brackets and having inwardly-directed perforations, and steam-heating pipes extending lengthwise of the cylinder, between the live-steam pipes.

THOMAS HARLOW SAMPSON.

Witnesses:
ROSA KLAR,
JOSEPH C. HELMER.